United States Patent [19]

Snyder et al.

[11] 4,452,704

[45] Jun. 5, 1984

[54] METHOD FOR TREATING AQUEOUS MEDIUMS

[75] Inventors: William R. Snyder, Warminster; Diane Feuerstein, Bensalem, both of Pa.

[73] Assignee: Betz Laboratories, Inc., Trevose, Pa.

[21] Appl. No.: 546,238

[22] Filed: Oct. 28, 1983

Related U.S. Application Data

[62] Division of Ser. No. 337,159, Jan. 5, 1982, Pat. No. 4,427,568, which is a division of Ser. No. 254,842, Apr. 16, 1981, Pat. No. 4,324,664.

[51] Int. Cl.$^3$ .............................................. B01F 17/22
[52] U.S. Cl. .................................. 210/701; 252/355; 422/17
[58] Field of Search ............................... 210/696–701, 210/729–736; 422/17; 252/180, 181, 355–357

[56] References Cited

U.S. PATENT DOCUMENTS

| | | | |
|---|---|---|---|
| 2,028,091 | 1/1936 | Jaeger | 260/106 |
| 2,176,423 | 10/1939 | Jaeger | 260/481 |
| 3,035,973 | 5/1962 | Klotz | 167/56 |
| 3,692,685 | 9/1972 | Lamberti et al. | 210/698 X |
| 4,029,577 | 6/1977 | Godlewski et al. | 210/701 |
| 4,146,473 | 3/1979 | Edelmann et al. | 210/729 X |
| 4,153,549 | 5/1979 | Wang et al. | 210/729 |

*Primary Examiner*—Thomas G. Wyse
*Attorney, Agent, or Firm*—Alexander D. Ricci; Bruce E. Peacock

[57] ABSTRACT

Method and composition for controlling the deposition of scale imparting precipitates on structural parts of a system exposed to an aqueous medium containing scale imparting precipitates, under scale imparting conditions, are disclosed. Specifically, these precipitates are either calcium carbonate, calcium sulfate, calcium phosphate or mixtures thereof. The method and composition are also efficacious in dispersing inorganic and organic matter, which may exist within a cooling system, boiler system, or the like. The composition comprises an acrylic acid/lower alkyl hydroxylated acrylate copolymer (I) which is administered to the system in combination with an ester of an aliphatic sulphodicarboxylic acid (II). Preferred esters include the dioctylester of sodium sulphosuccinic acid, the diisobutylester of sodium sulphosuccinic acid, the dihexylester of sodium sulphosuccinic acid, and the diamylester of sodium sulphosuccinic acid. The method comprises administering an effective amount of the combined treatment (I and II) to the aqueous system to be treated.

18 Claims, No Drawings

METHOD FOR TREATING AQUEOUS MEDIUMS

This is a division of application Ser. No. 337,159, filed on Jan. 5, 1982, now U.S. Pat. No. 4,427,568, which is a division of Ser. No. 254,842 filed on Apr. 16, 1981, now U.S. Pat. No. 4,324,664.

FIELD OF THE INVENTION

The present invention relates to a method and composition for controlling the formation and deposition of scale forming salts, particularly calcium carbonate, calcium phosphate, and calcium sulfate, in aqueous mediums. The compositions and methods of the present invention also act as dispersants for suspended particulate matter, such as clay and iron oxides, and surprisingly serve to effectively disperse organic matter, such as oil.

BACKGROUND OF THE INVENTION

Although the invention has general applicability to any given system where the formation and deposition of calcium carbonate, calcium phosphate and/or calcium sulfate is a potential problem, or where other problems due to deposition of suspended inorganic matter such as iron oxide and clay, or organic matter, such as oil, are encountered, the invention will be discussed in detail as it concerns cooling water and boiling water systems.

The term "cooling water" is applied whenever water is circulated through equipment to absorb and carry away heat. This definition includes air conditioning systems, engine jacket systems, refrigeration systems as well as the multitude of industrial heat exchange operations, such as found in oil refineries, chemical plants, steel mills, etc.

The once-through cooling system, as the name implies, is one in which the water is passed through the heat exchange equipment and the cooling water is then discharged to waste. Usually, a oncethrough system is employed only where water at suitably low temperature is readily available in large volume and at low cost. The normal source of once-through cooling water is from wells, rivers and lakes where the cost involved is that of pumping only. In a oncethrough system, no evaporation takes place and consequently the water does not concentrate. Circulating water characteristics are the same as the makeup water.

The use of a recirculating system, in which a cooling tower, spray pond, evaporative condenser and the like serve to dissipate heat, permits great economy in makeup water requirements. With dwindling supplies of fresh cold water available for industries' cooling requirements, increased use must be made of recirculating systems in which the cooling water is used over and over again.

After passage of the circulating water through the heat exchange equipment, the water is cooled when passing over the cooling tower. This cooling effect is produced by evaporation of a portion of the circulating water in passing over the tower. By virtue of the evaporation which takes place in cooling, the dissolved solids and suspended solids in the water become concentrated.

The circulating water becomes more concentrated than the makeup water due to this evaporation loss. Cycles of concentration is the term employed to indicate the degree of concentration of the circulating water as compared with the makeup. For example, two cycles of concentration indicates the circulating water is twice the concentration of the makeup water.

Deposits in lines, heat exchange equipment, etc., may originate from several causes. For example, the precipitation of calcium sulfate and calcium phosphate will form scale. In addition, solids foulant particles may enter the system. Through collisions with neighboring solids particles, these foulants may agglomerate to a point where they either foul a heat transfer surface or begin to accumulate in lower flow areas of the system. On the other hand, corrosion is the electrochemical reaction of a metal with its environment. It is a destructive reaction and, simply stated, is the reversion of refined metals to their natural state. For example, iron ore is iron oxide. Iron ore is refined into steel. When steel corrodes, it also forms iron oxide.

In speaking of deposits which form in cooling water systems, it is important to bear in mind the mechanism causing the deposit, otherwise confusion may result. In general, the term "scale" applies to deposits which result from crystallization or precipitation of salts from solution. Wasting away of a metal is the result of corrosion. The agglomeration of suspended solids particles also results in deposit formation. While a deposit results in all of these cases, the mechanisms of formation are different and different corrective methods are required to prevent each type of deposit.

Some of the factors which affect scale formation are temperature, rate of heat transfer, the calcium, sulfate, magnesium, silica, phosphate, alkalinity, dissolved solids and pH of the water.

In the past in order to minimize the formation of the scale forming salts, cooling water systems were operated at pH's where the solubility of the "hardness" or "scale forming" ions was the greatest. Because the pH's of the systems were acidic, corrosion inhibitors together with dispersants were the normal treatment. Corrosion inhibition in most instances required chromate treatment. With the advent of tight control regarding toxic pollutant discharge, operating parameters of cooling water systems had to be changed in an attempt to utilize non-chromate treatment. The development of high pH and/or non-chromate corrosion programs over the past few years has concurrently enhanced the potential for heat exchange fouling due to chemical precipitation. Presently, most non-chromate treatments include phosphate and/or phosphonic acid compounds, such as the alkali metal polyphosphates, organophosphates, e.g., phosphate esters, etc., amino-trimethylenephosphonic acid, hydroxy ethylidene diphosphonic acid, and water soluble salts thereof. However, the reversion of the polyphosphates and the organic phosphates plus the use of alkaline operating conditions leads to the formation and deposition of the highly insoluble calcium phosphate. Also since there may be phosphate in the makeup water supply, for example, tertiary sewage treatment effluent for makeup water, calcium phosphate scaling has become one of the major problems encountered. Of course, the formation of calcium sulfate in cooling water systems also results in a scale formation problem. Calcium sulfate is often associated with the use of sulfuric acid for pH control, especially in connection with sidestream softening, and with the greater calcium concentrations associated with higher cycles of concentration.

Another principal scale-forming material encountered in cooling water systems is calcium carbonate formed by the decomposition of calcium bicarbonate.

This compound has an inverse solubility curve (i.e., the solubility decreases as the system temperature increases), and its solubility is lower than most of the other potential scale imparting moieties that may be present in cooling systems. Calcium carbonate is soluble in acidic solutions, but since most cooling systems are operated at alkaline conditions to retard corrosion, calcium carbonate scaling remains a problem.

Although steam generating sytems are somewhat different from cooling water systems, they share a common problem in regard to deposit formation.

As detailed in the Betz Handbook of Industrial Water Conditioning, 8th Edition, 1980, Betz Laboratories, Inc., Trevose, PA, Pages 85–96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, those operations are only moderately effective. In all cases, external treatment does not in itself provide adequate treatment since muds, sludge, silts and hardness-imparting ions escape the treatment, and eventually are introduced into the steam generating system. The problems which result from their introduction into the steam generating system are apparent. Since the deposit forming materials are present, they have a tendency to accumulate upon concentration of the water and to settle at points in the system where there is low flow, thus restricting water circulation. The baking of mud and/or sludge on tubes and sheets will result in overheating and failure, thereby requiring downtime for repair or replacement of the structural parts. In addition, mud, sludge and silts may become incorporated in scale deposits adding to their volume and heat insulating effect.

Accordingly, internal treatments have been necessary to maintain the mud and silts in a suspended state. These internal treatments have been generally referred to in the industry as sludge conditioning agents.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their deposition. The carbonates of magnesium and calcium are not the only problem compounds as regards scale, but also waters having high contents of phosphate, sulfate or silicate ions either occurring naturally or added for other purposes cause problems since calcium and magnesium, and any iron or copper present, react with each and deposit as boiler scale. As is obvious, the deposition of scale on the structural parts of a steam generating system causes poorer circulation and lower heat transfer capacity, resulting accordingly in an overall loss in efficiency.

Although the foregoing is directed for the most part to cooling water systems and boiler water systems, or more specifically steam generating systems, the same problems occur in scrubber systems and the like. Any aqueous system having calcium and magnesium cations and the exemplified anions, particularly the phosphate and sulfate anions, will experience the formation and deposition of scaling salts.

In addition to the above noted scale and sludge formation problem in cooling and boiler systems, process leaks may often cause oil agglomeration or the like in the particular system. In addition, in certain scrubber systems, hydrocarbon vapors or mists may be drawn into the process gas stream and are scrubbed by the scrubbing liquor. Accordingly, it is highly desirable to disperse such oil agglomerations.

Many and different type materials have been used for the treatment of water systems. Of the vast number may be mentioned alginates, lignins, lignosulfonates, tannins, carboxymethyl cellulose materials, and synthetic polymers such as polyacrylates and polymethacrylates. For instance, in U.S. Pat. No. 4,029,577 (Godlewski et al), of common assignment herewith, certain acrylic acid/hydroxylated lower alkyl acrylate copolymers are disclosed as being effective in controlling the formation and deposition of scale and/or suspended solid matter which otherwise would occur in aqueous mediums containing scale imparting ions and dispersed particles. In U.S. Pat. No. 3,663,448 (Ralston), the formation of solid scale-forming salts in aqueous solution is inhibited by adding to the solution small amounts of certain amino phosphonate compounds, together with a water soluble polymer having a molecular weight from about 500 to about 12,000 selected from the group consisting of polyacrylic acid, copolymers of acrylic acid and up to 50% acrylamide and polyacrylamide in which at least 50% of the amide groups are hydrolyzed.

U.S. Pat. No. 4,209,398 (Ii et al) disclosed yet another water treating process wherein a polymer having a structural unit derived from a monomer having an ethylenically unsaturated bond and having one or more COOH radicals is combined with inorganic phosphates, phosphonic acids, organic phosphonic acid esters, or polyvalent metal salts, to prevent scale formation and corrosion.

U.S. Pat. Nos. 2,723,956 (Johnson); and 3,549,538 (Jacklin); also disclose varied approaches in the water treatment area. For instance, the Johnson U.S. Pat. No. 2,723,956 discloses a boiler scale treatment which comprises copolymers of maleic anhydride and other polymerizable mono-ethylenic compounds such as methyl vinyl ether, ethyl vinyl ether, styrene, alpha-methyl styrene, vinyl acetate, methyl methacrylate, isopentene, amylene, diisobutylene, isoheptene, nonene, dipentene, ethyl cinnamate or abietic acid.

In the Jacklin U.S. Pat. No. 3,549,538, disclosed are scale inhibition compositions and methods comprising a nitrilo phosphonate or nitrilo carboxylate compound, such as, nitrilotriacetic acid or nitrilomethylene phosphonic acid, and a water soluble sulfoxy free polar addition polymer having a molecular weight of at least 1,000. Preferred classes of the water soluble sulfoxy-free polar addition polymers comprise maleic anhydride-styrene copolymers and acrylic acid homo and copolymers.

Despite the efforts of the prior art, the water treatment industry is constantly searching for means for inhibiting scale formation and/or for dispersing solids particulate matter, efficiently and in a cost effective manner. It is especially desirable to provide a single treatment program which is efficacious in control of the formation and deposit of the noted scale forming salts, yet serves to disperse both inorganic and organic matter which may exist in the system to be treated.

GENERAL DESCRIPTION OF THE INVENTION

The present inventors have discovered that acrylic acid/lower alkyl hydroxy acrylate copolymers (I) in combination with a water soluble ester of an aliphatic sulphodicarboxylic acid (II) not only effectively control the formation of certain scale forming salts, but also act as an effective dispersant for both inorganic and organic matter. Specifically, the combined treatment of the present invention comprising the copolymer (I) and ester of aliphatic sulphodicarboxylic acid (II) has proven effective in controlling the formation and deposition of calcium sulfate, calcium carbonate, and calcium phosphate. Moreover, the combined treatment surprisingly serves to disperse inorganic solid particles such as clay and iron oxides, and also has proven effective in dispersing oil.

The specific acrylic acid/lower alkyl hydroxy acrylate copolymers (I) utilized in accordance with the present invention are disclosed in U.S. Pat. No. 4,029,577 (Godlewski et al). The entire disclosure of this patent is accordingly incorporated by reference.

Basically, the polymers (I) which are to be utilized in conjunction with the ester component (II) in the combined treatment are those containing essentially moieties (a) derived from an acrylic acid compound, i.e.,

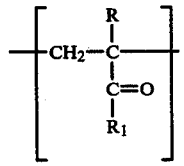

where R is hydrogen or a lower alkyl of from 1 to 3 carbon atoms and $R_1$=OH, OM, $NH_2$, where M is a water soluble cation, e.g., $NH_4$, alkali metal (K, and Na), etc.; and (b) moieties of an hydroxylated lower alkyl (C=2–6) acrylate as represented for example by the formula

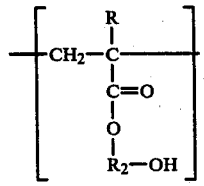

where R is H, or $CH_3$ and $R_2$ is a lower alkyl having from about 2 to 6 carbon atoms (the OH moiety may be attached to any of the C atoms in the alkyl group).

These polymers most advantageously have a mole ratio of moieties derived from an acrylic acid compound (Formula VI) to hydroxy alkyl acrylate derived moieties of from about 34:1 to about 1:4, and preferably 11:1 to 1:2, and possess a molecular weight of from 500 to 1,000,000 and preferably 1,000 to 500,000. The only criteria that is of importance that applies to the molar ratios of the described monomers in the copolymer, is that it is desirable to have a copolymer which is soluble in water. It should be noted that as the proportion of hydroxylated alkyl acrylate moieties increase, the solubility of the copolymer decreases.

The polymers (I) utilized in accordance with the invention can be prepared by vinyl addition polymerization or by treatment of an acrylic acid or salt polymer. More specifically, acrylic acid or derivates thereof or their water soluble salts, e.g., sodium, potassium, ammonium, etc. can be copolymerized with the hydroxy alkyl acrylate under standard copolymerization conditions utilizing free radicals such as benzoyl peroxide, azo bisisobutyronitrile or redox initiators such as ferrous sulfate and ammonium persulfate. The molecular weights of the resulting copolymer can be controlled utilizing standard chain control agents such as secondary alcohols (isopropanol), mercaptans, halocarbons, etc. Copolymers which may be utilized in accordance with the present invention are commercially available from National Starch Company. One preferred copolymer is sold by National Starch under the trademark "Natrol 42". This particular copolymer is an acrylic acid/2 hydroxypropyl acrylate copolymer having an acrylic acid: 2 hydroxypropyl acrylate molar ratio of 3:1 and a molecular weight of about 6000.

The hydroxyalkyl acrylate can be prepared by the addition reaction between the acrylic acid or its derivatives or water soluble salts and the oxide of the alkyl derivative desired. For example, the preferred monomer of the present invention is the propyl derivative. Accordingly, to obtain the hydroxylated monomer, acrylic acid is reacted with propylene oxide to provide the hydroxy propylacrylate monomer constituent of the copolymer utilized in accordance with the present invention.

The polymers of the present invention may also be prepared by reacting the polyacrylic acid or derivatives thereof with an appropriate amount of an alkylene oxide having from 2 to 6 carbon atoms such as ethylene oxide, propylene oxide and the like. The reaction takes place at the COOH or COM group of the moieties to provide the hydroxylated alkyl acrylate moiety.

The preferred copolymer prepared either by copolymerization or by reaction of polyacrylic acid or acrylate with the propylene oxide would be composed of units or moieties having the structural formulas

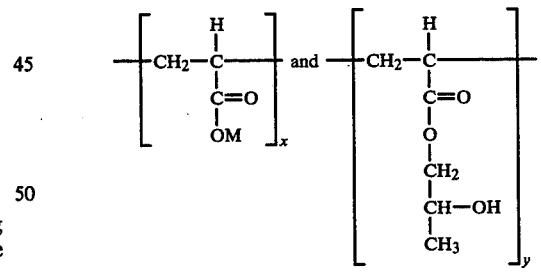

where M is as earlier defined and wherein the molar ratio of x to y is preferably 11:1 to 1:2. The copolymer preferably has a molelcular weight of from 1,000 to 500,000.

As to the ester component (II), there may be mentioned esters of sulpho saturated and unsaturated aliphatic dicarboxylic acids such as, for example, mono and disulphosuccinic, sulphochlorsuccinic, sulphoadipic, sulphopyrotartaric, sulphoglutaric, sulphosuberic, sulphosebacic, sulphomaleic, sulphofumaric, sulphodimethylsuccinic, sulphomethylglutaric, sulphomalonic, sulphopropylsuccinic, and sulphooctylglutaric acid. The esters are most desirably employed in their alkali forming metal salt or ammonium salt form.

These esters may be prepared by esterifying the corresponding sulpho acids, which acids may be first prepared via sulphonation of the unsulphonated saturated acid or by adding a sulphite or bisulphite to the corresponding unsaturated acid or its salts. Another method of preparing the sulpho acid includes treating the desired halogenated saturated acid with an alkali sulphite, preferably under pressure.

As is disclosed in U.S. Pat. No. 2,028,091, another preparative method consists of the esterification of the corresponding unsaturated acid and adding a bisulphite to the ester.

Preferably, the two alcohol molecules which unite with the carboxyl groups of the dicarboxylic acid are the same. However, it is to be noted that useful compounds may be formed in which the alcohol molecules reacting with the carboxyl groups are different. In other words, useful esters can be obtained in which one carboxyl group of the acid unites with one alcohol and another carboxyl group of the acid unites with a different alcohol molecule.

Also, while the most important esters (II) are those prepared with monohydric alcohols, useful esters can also be obtained with polyhydric alcohols.

The most common esters of the present invention are those in which the sulphonic group of the acid is a single sulphonic group. It is, however, possible to esterify di and polysulpho acids with the production of corresponding di and polysulpho esters. Such esters are included within the ambit of the invention.

Preferably, the ester component (II) of the combined treatment is derived from sulphosuccinic acid. These preferred esters include: the dioctylester of sodium sulphosuccinic acid, the dihexyl ester of sodium sulphosuccinic acid, the diisobutylester of sodium sulphosuccinic acid, and the diamyl ester of sodium sulphosuccinic acid. The specific ester which is most preferred for use is the dioctylester. These succinic acid esters are commercially available under the "Aerosol" trademark by American Cyanamid.

As to the number of carbon atoms in the alcohol molecule, which is esterified with the desired acid, the only important qualification is that the resulting ester compound remain water soluble. Accordingly, it is thought that the alcohol molecule may comprise from about 3 to about 18 carbon atoms.

Structurally, the ester component (II) may be represented by the formula:

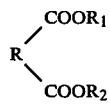

wherein R is an aliphatic carbon chain containing at least one sulphonic group and $R_1$ and $R_2$ may be the same or different, but are chosen from an alkyl group having from about 3 to about 18 carbon atoms.

The operable molar ratio of the copolymer (I) to ester component (II), in accordance with the invention, is from about 10:1 to 1:10. The preferred molar ratio of copolymer I:ester II is about 1:3 to 3:1.

The combined treatment (copolymer I and ester II) should be added to the desired aqueous system in an amount effective for the purpose, taking into consideration the respect of concentrations in the water of the potential scale and deposit forming species, the pH of the water and the chemical and physical properties of the combined treatment. The criteria for proper treatment of any aqueous system would be apparent to the worker in the art of water treatment. For the most part, the combined treatment will be effective when utilized at levels of from about 0.1 to 500 parts per million of water. Based upon experimental data, the preferred ester II is the dioctylester of sodium sulphosuccinic acid. The preferred combined treatment comprises administering to an aqueous medium from about 2–20 parts of acrylic acid/2 hydroxypropylacrylate-dioctylester of sodium sulphosuccinic acid (molar ratio of the acrylate copolymer(I):ester II=3:1) per one million parts of the aqueous medium to be treated.

The invention is applicable to any aqueous system wherein scale formation is a potential problem or wherein agglomeration of inorganic particulate matter or organic matter is potentially troublesome. For instance, in addition to use in boiler water and/or cooling water systems, the inventive composition and methods are also applicable to gas scrubbing systems wherein scrubbing mediums contain the requisite anions and cations which may precipitate as scale.

SPECIFIC EMBODIMENTS OF THE INVENTION

The invention will now be further described with reference to a number of specific examples which are to be regarded solely as illustrative, and not as restricting the scope of invention.

One method of evaluating deposit control activity of a material consists of measuring its ability to prevent bulk phase precipitation of the salt at conditions for which the salt would usually precipitate. It is additionally important to recognize that the material being evaluated is tested at "substoichiometric" concentrations. That is, typical molar ratios of precipitating cation to the material being evaluated are on the order of 20:1 and much greater. Consequently, stoichiometric sequestration is not the route through which bulk phase precipitation is prevented. The well known phenomenon is also called "threshold" treatment and is widely practiced in water treatment technology for the prevention of scale (salt) deposits from forming on various surfaces. In the results that follow calcium phosphate, calcium carbonate, and calcium sulfate salts commonly found in industrial water systems under various conditions have been selected as precipitants. The combined treatment of the present invention has been evaluated for its ability to prevent precipitation (i.e., inhibit crystallization) of these salts. The results are expressed as "percent inhibition", positive values indicate the stated percentage of the precipitate was prevented from being formed. Except as where noted to the contrary, the following conditions, solutions, and testing procedure were utilized to perform the calcium carbonate, calcium phosphate and calcium sulfate inhibition tests, the results of which are reported herein below in the following Tables.

| CALCIUM PHOSPHATE INHIBITION PROCEDURE | |
|---|---|
| Conditions | Solutions |
| T = 70° C. | 36.76 $CaCl_2.2H_2O$/liter $DIH_2O$ |
| pH 8.5 | 0.4482 g $Na_2HPO_4$/liter $DIH_2O$ |
| 17 hour equilibration | |
| $Ca^{+2}$ = 250 ppm as $CaCO_3$ | |
| $PO_4^{-3}$ = 6 ppm | |
| Procedure | |
| (1) To about 1800 ml $DIH_2O$ in a 2 liter volumetric flask, | |

CALCIUM PHOSPHATE INHIBITION PROCEDURE add 20 ml of CaCl$_2$.2H$_2$O solution followed by 2 drops of conc. HCl.
(2) Add 40 ml of Na$_2$HPO$_4$ solution.
(3) Bring volume to 2 liters with DI water.
(4) Place 100 ml aliquots of solution in 4 oz glass bottles.
(5) Add treatment.
(6) Adjust pH as desired.
(7) Place in 70° C. water bath and equilibrate for 17 hours.
(8) Remove samples and filter while hot through 0.2μ filters.
(9) Cool to room temperature and take Absorbance measurements using Leitz photometer (640 nm).
   Preparation for Leitz
   a. 5 mls filtrate
   b. 10 mls Molybdate Reagent
   c. 1 dipper Stannous Reagent
   d. Swirl 1 minute, pour into Leitz cuvette; wait 1 minute before reading
(10) Using current calibration curve (Absorbance vs ppm PO$_4^{-3}$) find ppm PO$_4^{-3}$ of each sample.

Calculation

% Inhibition =

$$\frac{\text{ppm PO}_4^{-3} \text{(treated)} - \text{ppm PO}_4^{-3} \text{(control)}}{\text{ppm PO}_4^{-3} \text{(stock)} - \text{ppm PO}_4^{-3} \text{(control)}} \times 100$$

CALCIUM SULFATE INHIBITION PROCEDURE

| Conditions | Chemicals |
|---|---|
| pH = 7.0 | 1 × 10$^{-1}$ M CaCl$_2$.2H$_2$O |
| T = 50° C. | 1 × 10$^{-1}$ M Na$_2$SO$_4$ |
| 24 hr. equilibrium | |
| Ca$^{+2}$ = 2000 ppm | |
| SO$_4^{-2}$ = 4800 ppm | |

Procedure
(1) Add 50 ml of 10$^{-1}$ CaCl$_2$.2H$_2$O pre-adjusted to pH 7.0 to a 4 oz. bottle.
(2) Add treatment.
(3) Add 50 ml of 10$^{-1}$ Na$_2$SO$_4$ pre-adjusted to pH 7.0.
(4) Heat samples for 24 hours in a 50° C. water bath.
(5) Cool for 30 minutes, at least.
(6) Filter 5 ml through 0.45μ filters.
(7) Add NaOH to pH 12.0 and dilute to 50 ml with DI H$_2$O.
(8) Add Ca$^{+2}$ indicator (1 level).
(9) Titrate to purple-violet endpoint with EDTA.

Calculation

% Inhibition =

$$\frac{\text{mls titrant (treated)} - \text{mls titrant (control)}}{\text{mls titrant (Ca}^{+2}\text{ stock)} - \text{mls titrant (control)}} \times 100$$

Calcium Carbonate Inhibition

| Conditions | Solutions |
|---|---|
| pH = 9.0, 8.5 | 3.25 g CaCl$_2$.2H$_2$O/liter DI H$_2$O |
| T = 70° C. | 2.48 g Na$_2$CO$_3$/liter DI H$_2$O |
| 5 hour equilibrium | |
| 442 ppm Ca$^{+2}$ | |
| 702 ppm CO$_3^{-2}$ | |

PROCEDURE (1) Add 50 ml CaCl$_2$.2H$_2$O pre-adjusted to pH 9.0
(2) Add treatment
(3) Add 50 ml Na$_2$CO$_3$ pre-adjusted to pH 9.0
(4) Heat 5 hours at 70° C. water bath. Remove and cool to room temperature.
(5) Filter 5 mls through 0.2μ filters.
(6) Adjust samples to pH <1.0 with conc. HCl (1 g Conc. HCl)
(7) Allow to stand at least 15 minutes.
(8) Dilute to 50 mls with DI H$_2$O.
(9) Bring pH to 12.0 with NaOH.
(10) Add Ca$^{+2}$ indicator (1 level).
(11) Titrate with EDTA to purple-violet endpoint.

Calculation

Calcium Carbonate Inhibition

% Inhibition =

$$\frac{\text{ml EDTA titrated (treated)} - \text{ml EDTA titrated (control)}}{\text{ml EDTA titrated (Ca}^{+2}\text{ stock)} - \text{ml EDTA titrated (control)}} \times 100$$

TABLE I

AA/HPA and Dioctylester of Sodium Sulphosuccinic Acid CaCO$_3$ Inhibition

| Ratio AA/HPA I: Ester II | ppm Total Actives | % Inhibition |
|---|---|---|
| 1:0 | ½ | 0.0 |
| | 1 | 0.6* |
| | 2 | 20.9 |
| | 2.5 | 38.1 |
| | 5.0 | 50.3 |
| 0:1 | ½ | 2.6 |
| | 1 | 2.4* |
| | 2 | 0.0 |
| | 2.5 | 0.0 |
| | 5.0 | 0.0 |
| 1:1 | ½ | 0.0 |
| | 1 | 0.0 |
| | 2 | 0.0 |
| | 2.5 | 18.2 |
| | 5.0 | 44.4 |
| 1:3 | ½ | 0.0 |
| | 1 | 0.0 |
| | 2 | 0.0 |
| | 2.5 | 0.0 |
| | 5.0 | 31.8 |
| 3:1 | ½ | 0.0 |
| | 1 | 0.0 |
| | 2 | 0.0 |
| | 2.5 | 40.1 |
| | 5.0 | 56.1 |

AA/HPA = acrylic acid/2 hydroxypropylacrylate molar ratio acid/acrylate = 3, molecular weight ≈ 6,000
* = average between 2 tests Here, it can be seen that at the 3:1 molar ratio (AA/HPA I:ester II), the combined treatment is more effective in inhibiting calcium carbonate formation than equivalent treatment dosages of either AA/HPA itself or the ester itself.

TABLE II

AA/HPA and Dioctylester of Sodium Sulphosuccinic Acid CaSO$_4$ Inhibition

| Ratio AA/HPA I: Ester II | ppm Total Actives | % Inhibition |
|---|---|---|
| 1:0 | ½ | 10.5 |
| | 1 | 31.8* |
| | 2 | 99.0 |
| | 2.5 | 93.2 |
| | 5.0 | 93.8 |
| 0:1 | ½ | 0.2 |
| | 1 | 4.7* |
| | 2 | 0.1 |
| | 2.5 | 0.0 |
| | 5.0 | 0.7 |
| 1:1 | ½ | 2.0 |
| | 1 | 13.1* |
| | 2 | 40.2 |
| | 2.5 | 35.9 |
| | 5.0 | 93.2 |
| 1:3 | ½ | 0.3 |
| | 1 | 3.4* |
| | 2 | 10.5 |
| | 2.5 | 16.6 |
| | 5.0 | 40.5 |
| 3:1 | ½ | 5.0 |
| | 1 | 18.8* |

TABLE II-continued

AA/HPA and Dioctylester
of Sodium Sulphosuccinic Acid
CaSO₄ Inhibition

| Ratio AA/HPA I: Ester II | ppm Total Actives | % Inhibition |
|---|---|---|
|  | 2 | 76.6 |
|  | 2.5 | 82.0 |
|  | 5.0 | 84.7 |

AA/HPA = Same as Table I
* = average between 2 tests

TABLE III

AA/HPA and Dioctylester of Sodium Sulphosuccinic Acid
Ca₃(PO₄)₂ Inhibition

| Ratio AA/HPA I: Ester II | ppm Total Actives | % Inhibition |
|---|---|---|
| 1:0 | 2 | 0.0 |
|  | 3 | 1.0 |
|  | 4 | 3.9 |
|  | 4.5 | 8.0 |
|  | 5 | 8.1 |
|  | 6 | 25.0 |
|  | 8 | 81.1 |
|  | 10 | 85.9 |
|  | 20 | 83.3 |
| 0:1 | 1 | 0.0 |
|  | 2 | 0.0 |
|  | 4 | 0.0 |
|  | 5 | 0.0 |
|  | 8 | 1.3 |
|  | 10 | 0.0 |
|  | 20 | 2.0 |
| 1:1 | 2 | 0.0 |
|  | 4 | 1.6 |
|  | 5 | 1.5 |
|  | 8 | 8.8 |
|  | 10 | 3.4 |
|  | 20 | 90.1 |
| 1:3 | 2 | 0.0 |
|  | 4 | 3.3 |
|  | 5 | 4.6 |
|  | 8 | 0.9 |
|  | 10 | 8.7 |
|  | 20 | 12.2 |
| 3:1 | 2 | 0.0 |
|  | 4 | 15.0 |
|  | 5 | 0.8 |
|  | 6 | 26.0 |
|  | 8 | 36.6 |
|  | 10 | 86.0 |
|  | 20 | 91.3 |

AA/HPA = Same as Table I

Here, it can be seen, that at the higher dosage levels, and at a molar ratio of 3:1 (AA/HPA I:ester II), the combined treatment is more effective in inhibiting calcium phosphate formation, than equivalent treatment dosages of either AA/HPA itself or the ester itself.

TABLE IIIA

Inhibition of Ca₃(PO₄)₂

| Material | ppm (active) | % Inhibition |
|---|---|---|
| AA/HPA | 3.0 | 1 |
| DESSA | 1.0 | 0 |
| AA/HPA | 3.0 ⎫ | 15 |
| DESSA | 1.0 ⎭ |  |
| AA/HPA | 4.5 | 8 |
| DESSA | 1.5 | 0 |
| AA/HPA | 4.5 ⎫ | 26 |
| DESSA | 1.5 ⎭ |  |
| AA/HPA | 6.0 | 25 |
| DESSA | 2.0 | 0 |

TABLE IIIA-continued

Inhibition of Ca₃(PO₄)₂

| Material | ppm (active) | % Inhibition |
|---|---|---|
| AA/HPA | 6.0 ⎫ | 37 |
| DESSA | 2.0 ⎭ |  |

AA/HPA = Same as Table I
DESSA = dioctylester of sodium sulphosuccinic acid

Here, it can be seen that the combined AA/HPA and ester treatment, in calcium phosphate inhibition, is more effective than the inhibition afforded by the component parts of the combined treatment, at equivalent dosage levels.

TABLE IV

AA/HPA and Diamyl Sulphosuccinate
Calcium Phosphate Inhibition

| Ratio of AA/HPA to Ester | ppm Total Actives | Ca₃(PO₄)₂ % Inhibition |
|---|---|---|
| 1:0 | 5 | 6.3 |
|  | 10 | 87.5 |
|  | 20 | 90.7 |
| 0:1 | 5 | 0 |
|  | 10 | 0 |
|  | 20 | 5.1 |
| 1:1 | 5 | 3.9 |
|  | 10 | 1.6 |
|  | 20 | 87.3 |
| 1:3 | 5 | 0.5 |
|  | 10 | 6.3 |
|  | 20 | 3.9 |
| 3:1 | 5 | 11.6 |
|  | 10 | 38.2 |
|  | 20 | 83.8 |

AA/HPA = Same as Table I

TABLE V

AA/HPA and Sodium Dihexyl Sulphosuccinate
Calcium Sulphate Inhibition

| Ratio AA/HPA to Ester | ppm Total Actives | Inhibition |
|---|---|---|
| 1:0 | 1.0 | 42.9 |
|  | 2.5 | 98.4 |
|  | 5.0 | 97.0 |
| 0:1 | 1.0 | 1.0 |
|  | 2.5 | 0.6 |
|  | 5.0 | 2.7 |
| 1:1 | 1.0 | 18.6 |
|  | 2.5 | 72.3 |
|  | 5.0 | 97.9 |
| 1:3 | 1.0 | 5.5 |
|  | 2.5 | 18.9 |
|  | 5.0 | 65.9 |
| 3:1 | 1.0 | 27.6 |
|  | 2.5 | 97.4 |
|  | 5.0 | 98.2 |

AA/HPA = Same as Table I

TABLE VI

AA/HPA and Sodium Diamyl Sulphosuccinate
Calcium Carbonate Inhibition at pH 8.5

| Ratio AA/HPA to Ester | ppm Total Actives | % Inhibition |
|---|---|---|
| 1:0 | 1.0 | 5.3 |
|  | 2.5 | 42.6 |
|  | 5.0 | 51.3 |
| 0:1 | 1.0 | 9.3 |
|  | 2.5 | 0 |
|  | 5.0 | 0 |
| 1:1 | 1.0 | 0 |
|  | 2.5 | 23.3 |
|  | 5.0 | 50.6 |
| 1:3 | 1.0 | 1.3 |

TABLE VI-continued

AA/HPA and Sodium Diamyl Sulphosuccinate
Calcium Carbonate Inhibition at pH 8.5

| Ratio AA/HPA to Ester | ppm Total Actives | % Inhibition |
|---|---|---|
|  | 2.5 | 0 |
|  | 5.0 | 19.3 |
| 3:1 | 1.0 | 0 |
|  | 2.5 | 42.0 |
|  | 5.0 | 59.3 |

In order to demonstrate the effectiveness of the combined treatment composition and method in dispersing suspended particulate matter, the following procedures using $Fe_2O_3$ and clay, separately, as suspended solids, were undertaken. The results appear in the following tables. In the results, it is noted that increasing Δ%T values indicate better treatment as more particles remain suspended in the aqueous medium.

CLAY DISPERSION (KAOLIN) PROCEDURE

Conditions | Solutions
---|---
T = 25° C. | 0.1% solution Hydrite UF in $DIH_2O$
pH = 7.5 | 3.68 g $CaCl_2.2H_2O$/100 ml $DIH_2O$
200 ppm $Ca^{+2}$ as $CaCO_3$ |

Procedure
(1) Prepare a suspension of 0.1% Hydrite UF in $DIH_2O$.
(2) Adjust hardness to 200 ppm $Ca^{+2}$ as $CaCO_3$ using $CaCl_2.2H_2O$ solution - 8 ml/1000 ml of Hydrite solution.
(3) Using overhead mixer, mix suspension ½ hour at 1000 rpms.
(4) Remove solution to magnetic stirrer and adjust to pH 7.5 (about 20 minutes to stabilize pH).
(5) Return solution to overhead mixer.
(6) Take 90 ml aliquots of suspension and place 4 oz. glass bottle.
(7) Add treatment and DI water to bring total volume to 100 ml.
(8) Cap bottle, invert several times and place on reciprocating shaker at a moderate speed of about 40 spm for ½ hour.
(9) Place on vibration-proof surface and allow to stand 18 hours.
(10) Without disturbing settled phase, pipet the top 40 mls off the sample. Place in a cell and read % T (at 415 nm).

Calculation
Δ % T = % T (control) − % T (treated)

$Fe_2O_3$ DISPERSION PROCEDURE

Conditions | Solutions
---|---
T = 25° C. | 0.1% solution $Fe_2O_3$ in $DIH_2O$
pH = 7.5 | 3.68 g $CaCl_2.2H_2O$/100 ml $DIH_2O$
200 ppm $Ca^{+2}$ as $CaCO_3$ |

Procedure
(1) Prepare a suspension of 0.1% $Fe_2O_3$ in $DIH_2O$.
(2) Adjust hardness to 200 ppm $Ca^{+2}$ as $CaCO_3$ using $CaCl_2.2H_2O$ solution - 8 ml/1000 ml of $Fe_2O_3$ solution.
(3) Using overhead mixer, mix suspension ½ hour at 1000 rpms.
(4) Remove solution to magnetic stirrer and adjust to pH 7.5 (about 20 minutes to stabilize pH).
(5) Return solution to overhead mixer.
(6) Take 90 ml aliquots of suspension and place 4 oz. glass bottle.
(7) Add treatment and DI water to bring total volume to 100 ml.
(8) Cap bottle, invert several times and place on reciprocating shaker at a moderate speed of about 40 spm for ½ hour.
(9) Place on vibration-proof surface and allow to stand 18 hours.
(10) Without disturbing settled phase, pipet the top 40 mls off the sample. Place in a cell and read % T (at 415 nm).

Calculation
Δ % T = % T (control) − % T (treated)

TABLE VII

AA/HPA and Dioctylester of Sodium Sulphosuccinic Acid
Ferric Oxide Dispersion

| Ratio AA/HPA:ester | ppm Total Actives | Δ % Transmittance |
|---|---|---|
| 1:0 | ½ | 1.1 |
|  | 1 | 13.8 |
|  | 2 | 38.4 |
|  | 2.5 | 24.5 |
|  | 5.0 | 53.5 |
|  | 10.0 | 61.0 |
| 0:1 | ½ | 0.0 |
|  | 1 | 1.3 |
|  | 2 | 0.0 |
|  | 2.5 | 2.7 |
|  | 5.0 | 4.0 |
|  | 10.0 | 2.0 |
| 1:1 | ½ | 1.0 |
|  | 1 | 0.0 |
|  | 2 | 3.7 |
|  | 2.5 | 0.0 |
|  | 5.0 | 20.0 |
|  | 10.0 | 51.0 |
| 1:3 | ½ | 0.0 |
|  | 1 | 0.0 |
|  | 2 | 0.0 |
|  | 2.5 | 0.7 |
|  | 5.0 | 0.0 |
|  | 10.0 | 18.5 |
| 3:1 | ½ | 0.0 |
|  | 1 | 4.1 |
|  | 2 | 31.6 |
|  | 2.5 | 2.0 |
|  | 5.0 | 27.5 |
|  | 10.0 | 54.5 |

AA/HPA = same as Table I

TABLE VIII

AA/HPA and Dioctylester of Sodium Sulphosuccinic Acid
Clay Dispersion

| Ratio AA/HPA:ester | ppm Total Actives | Δ % Transmittance |
|---|---|---|
| 1:0 | ½ | 9.9 |
|  | 1 | 24.5* |
|  | 2 | 58.7 |
|  | 2.5 | 48.2 |
|  | 5.0 | 58.7 |
| 0:1 | ½ | 1.1 |
|  | 1 | 0.0* |
|  | 2 | 0.0 |
|  | 2.5 | 0.0 |
|  | 5.0 | 0.0 |
| 1:1 | ½ | 6.8 |
|  | 1 | 7.1* |
|  | 2 | 19.7 |
|  | 2.5 | 19.4 |
|  | 5.0 | 49.9 |
| 1:3 | ½ | 2.9 |
|  | 1 | 3.2* |
|  | 2 | 7.1 |
|  | 2.5 | 5.2 |
|  | 5.0 | 20.2 |
| 3:1 | ½ | 5.1 |
|  | 1 | 9.0* |
|  | 2 | 32.6 |
|  | 2.5 | 37.2 |
|  | 5.0 | 54.7 |

AA/HPA = same as Table I
* = average between 2 tests

TABLE IX

AA/HPA and Sodium Diisobutyl Sulphosuccinic
Ferric Oxide Dispersion

| Ratio AA/HPA to Ester | ppm Total Actives | Δ % Transmittance |
|---|---|---|
| 1:0 | 2.5 | 16.9 |
|  | 5.0 | 64.7 |

TABLE IX-continued
AA/HPA and Sodium Diisobutyl Sulphosuccinic Ferric Oxide Dispersion

| Ratio AA/HPA to Ester | ppm Total Actives | Δ % Transmittance |
|---|---|---|
|  | 10.0 | 69.2 |
| 0:1 | 2.5 | 0 |
|  | 5.0 | 1.7 |
|  | 10.0 | 0 |
| 1:1 | 2.5 | 0 |
|  | 5.0 | 15.7 |
|  | 10.0 | 65.2 |
| 1:3 | 2.5 | 0 |
|  | 5.0 | 1.7 |
|  | 10.0 | 17.7 |
| 3:1 | 2.5 | 5.2 |
|  | 5.0 | 47.9 |
|  | 10.0 | 68.4 |

AA/HPA = same as Table I

TABLE X
AA/HPA and Diisobutyl Sulphosuccinate Clay Dispersion

| Ratio of AA/HPA to Aerosol IB45 | ppm Total Actives | Δ % T |
|---|---|---|
| 1:0 | 1.0 | 14.8 |
|  | 2.5 | 48.9 |
|  | 5.0 | 61.6 |
| 0:1 | 1.0 | 0 |
|  | 2.5 | 0.4 |
|  | 5.0 | 0.6 |
| 1:1 | 1.0 | 8.7 |
|  | 2.5 | 23.5 |
|  | 5.0 | 51.7 |
| 1:3 | 1.0 | 3.1 |
|  | 2.5 | 7.3 |
|  | 5.0 | 23.8 |
| 3:1 | 1.0 | 8.6 |
|  | 2.5 | 41.2 |
|  | 5.0 | 54.4 |

AA/HPA = same as Table I

In order to determine the effectiveness of the combined treatment of the present invention in dispersing organic substances, particularly oil, the following procedure and examples were undertaken.

OIL DISPERSION TEST

| Conditions | Solutions |
|---|---|
| 1000 ppm Oil | 36.72 g CaCl$_2$.2H$_2$O/l1 DIH$_2$O |
| 125 ppm Ca$^{+2}$ as CaCO$_3$ | |
| pH 7.5 | |
| 18 hour equilibrium | |
| Ambient Temperature | |

Procedure
(1) Prepare a 125 ppm Ca$^{+2}$ as CaCO$_3$ solution.
For 2 liters:
a. Add 10 ml of CaCl$_2$.2H$_2$O solution to 1950 ml DIH$_2$O.
b. Adjust pH to 7.5.
c. Bring volume to 2 liters with DIH$_2$O.
(2) To 4 oz. glass bottles, add the desired treatment.
(3) Then add 0.10 g of oil.
(4) Next add 99.90 g of the solution prepared in step #1.
(5) Shake at high speed on shaker for 15 minutes.
(6) Let stand at room temperature for 18 hours.
(7) Measure % light transmittance (415 nm) by pipetting 30 mls of sample into the Leitz cuvette. Take sample from the center without disturbing the layers.
(8) Calculate Δ % T.
Δ % T = % T (control) − % T (treated)

TABLE XI
AA/HPA and Dioctyl Ester of Sodium Sulphosuccinate Oil Dispersion

| Ratio of AA/HPA to Ester | ppm Total Actives | Δ % T |
|---|---|---|
| 1:0 | 0.5 | 0 |
|  | 1.0 | 0 |
|  | 2.5 | 0 |
| 0:1 | 0.5 | 23.1 |
|  | 1.0 | 64.7 |
|  | 2.5 | 43.6 |
| 1:1 | 0.5 | 2.8 |
|  | 1.0 | 20.8 |
|  | 2.5 | 47.3 |
| 1:3 | 0.5 | 11.0 |
|  | 1.0 | 57.4 |
|  | 2.5 | 50.9 |
| 3:1 | 0.5 | 3.1 |
|  | 1.0 | 3.1 |
|  | 2.5 | 38.8 |

AA/HPA = same as Table I
Here, it can be seen that the 1:3 molar ratio AA/HPA:ester is especially efficacious in dispersing oil.

TABLE XII
AA/HPA and Dihexyl Sulphosuccinate Oil Dispersion

| Ratio of AA/HPA to Ester | ppm Total Actives | Δ % T |
|---|---|---|
| 1:0 | 1.0 | 0.0 |
|  | 2.5 | 0.0 |
|  | 5.0 | 0.0 |
| 0:1 | 1.0 | 14.9 |
|  | 2.5 | 39.9 |
|  | 5.0 | 37.0 |
| 1:1 | 1.0 | 4.7 |
|  | 2.5 | 22.7 |
|  | 5.0 | 32.1 |
| 1:3 | 1.0 | 5.2 |
|  | 2.5 | 30.4 |
|  | 5.0 | 43.6 |
| 3:1 | 1.0 | 1.9 |
|  | 2.5 | 5.6 |
|  | 5.0 | 12.1 |

AA/HPA = same as Table I

While we have shown and described herein certain embodiments of the present invention, it is intended that there be covered as well any change or modification therein which may be made without departing from the spirit and scope of the invention as defined in the appended claims.

We claim:

1. A method of dispersing and maintaining dispersed particulate matter in a system having an aqueous medium which contains particulate matter selected from the group consisting of clay, iron oxide, and mixtures thereof, which method comprises adding to the aqueous medium an effective amount for the purpose of a water soluble polymer (I) comprising moieties (a) derived from an acrylic acid or water soluble salt thereof and moieties (b) of an hydroxlated lower alkyl acrylate, wherein the moieties of the polymer (I) have the following formulas

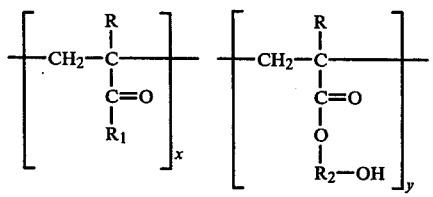

wherein R is hydrogen or a lower alkyl group of from 1 to 3 carbon atoms; $R_1$ is OH, OM or $NH_2$, where M is a water soluble cation; $R_2$ is a lower alkyl group of from about 2-6 carbon atoms and the mole ratio of x:y is about 34:1 to 1:4, said method comprising also adding to said system, an effective amount for the purpose of a water soluble ester of an aliphatic sulphodicarboxylic acid (II).

2. Method as defined in claim 1 wherein the molar ratio of said polymer (I) to said ester (II) is about 1:3 to about 3:1, and wherein said polymer (I) and said ester (II) are added to said system in an amount of about 0.1-500 parts (I) and (II) per million parts of said aqueous medium.

3. Method as defined in claim 1 wherein said polymer (I) has a molecular weight of about 500 to 1,000,000.

4. Method as defined in claim 3 wherein said polymer (I) comprises a copolymer of acrylic acid or a water soluble salt thereof and 2 hydroxypropyl acrylate, or hydroxyethylacrylate.

5. Method as defined in claim 1 wherein said ester (II) has the structural formula

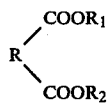

wherein R is an aliphatic carbon chain containing at least one sulphonic acid group and $R_1$ and $R_2$ may be the same or different, but are chosen from the group consisting of alkyl moieties having from about 3 to 18 carbon atoms.

6. Method as defined in claim 1 wherein said ester is a member selected from the group consisting of the dioctylester of sodium sulphosuccinic acid, the diisobutylester of sodium sulphosuccinic acid, the dihexylester of sodium sulphosuccinic acid, and the diamylester of sodium sulphosuccinic acid, and mixtures thereof.

7. Method as defined in claim 1 wherein said system comprises a steam generating system.

8. Method as defined in claim 1 wherein said system comprises a cooling water system.

9. Method as defined in claim 1 wherein said system comprises a gas scrubbing system.

10. A method of dispersing, and maintaining dispersed, oil, existing in an aqueous medium, said method comprising adding to said aqueous medium an effective amount for the purpose of a water soluble polymer (I) comprising moieties (a) derived from an acrylic acid or water soluble salt thereof and moieties (b) of an hydroxylated lower alkyl acrylate, wherein the moietites of the polymer (I) have the following formula

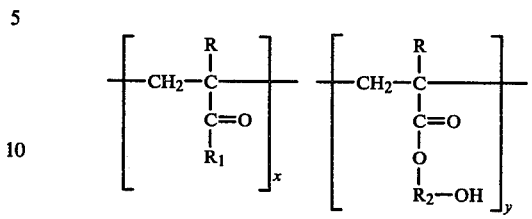

wherein R is hydrogen or a lower alkyl of from 1 to 3 carbon atoms; $R_1$ is OH, OM, or $NH_2$ where M is a water soluble cation; $R_2$ is a lower alkyl of from about 2-6 carbon atoms and the molar ratio of x to y is about 34:1 to 1:4, and an effective amount of a water soluble ester of an aliphatic dicarboxylic acid (II).

11. Method as defined in claim 10 wherein the molar ratio of said polymer (I) to said ester (II) is about 1:3 to about 3:1, and wherein said polymer (I) and said ester (II) are added to said aqueous medium in an amount of about 0.1-500 parts (I) and (II) per million parts of said aqeuous medium.

12. Method as defined in claim 10 wherein said polymer (I) has a molecular weight of about 500 to 1,000,000.

13. Method as defined in claim 10 wherein said polymer (I) comprises a copolymer of acrylic acid or a water soluble salt thereof and 2 hydroxypropyl acrylate, or hydroxyethylacrylate.

14. Method as defined in claim 10 wherein said ester (II) has the structural formula

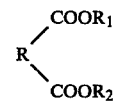

wherein R is an aliphatic carbon chain containing at least one sulphonic acid group and $R_1$ and $R_2$ may be the same or different, but are chosen from the group consisting of alkyl moieties having from about 3 to 18 carbon atoms.

15. Method as defined in claim 10 wherein said aqueous medium is that of a steam generating system.

16. Method as defined in claim 10 wherein said aqueous medium is that of a cooling water system.

17. Method as defined in claim 10 wherein said aqueous medium is that of a gas scrubbing system.

18. Method as defined in claim 10 wherein said ester (II) comprises a member selected from the group consisting of the dioctylester of sodium sulphosuccinic acid, the diisobutylester of sodium sulphosuccinic acid, the dihexylester of sodium sulphosuccinic acid, and the diamylester of sodium sulphosuccinic acid, and mixtures thereof.

* * * * *